(No Model.) 2 Sheets—Sheet 1.

C. GRATTAN.
Plow.

No. 237,179. Patented Feb. 1, 1881.

Witnesses
Geo. H. Strong.
Frank A. Brooks

Inventor
Christopher Grattan
By Dewey & Co.
Attys

N. PETERS, PHOTO-LITHOGRAPHER, WASHINGTON, D. C.

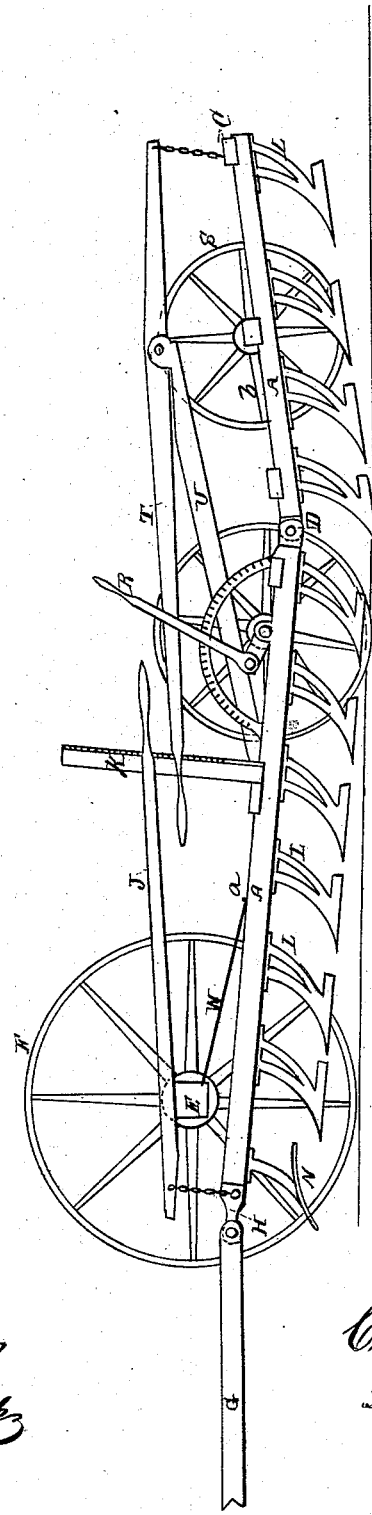

UNITED STATES PATENT OFFICE.

CHRISTOPHER GRATTAN, OF STOCKTON, CALIFORNIA.

PLOW.

SPECIFICATION forming part of Letters Patent No. 237,179, dated February 1, 1881.

Application filed November 8, 1880. (No model.)

*To all whom it may concern:*

Be it known that I, CHRISTOPHER GRATTAN, of Stockton, county of San Joaquin, and State of California, have invented an Improved Plow; and I hereby declare the following to be a full, clear, and exact description thereof.

My invention relates to gang-plows; and it consists in improved construction and arrangement and the various combinations of the operative parts, as fully hereinafter described and claimed.

A full description of my invention will be seen from the accompanying drawings in connection with the specification.

The object of my invention is to provide a number of shallow-cutting plows which shall work over a large surface at each passage of the machine, and which will pulverize the top of the ground and keep it in a moist condition, so that when larger plows are used for deep summer fallowing the ground will turn up in a finely-pulverized condition throughout, instead of being in large hard lumps, as would be the case when large plows are put into unbroken soil.

The plow is specially adapted for plowing in seed, and on account of its large size and consequent rapidity of its work, time may be given for the weeds to appear after the early rains before the seed is put in, so that the plow will cut down all these weeds.

Figure 1:
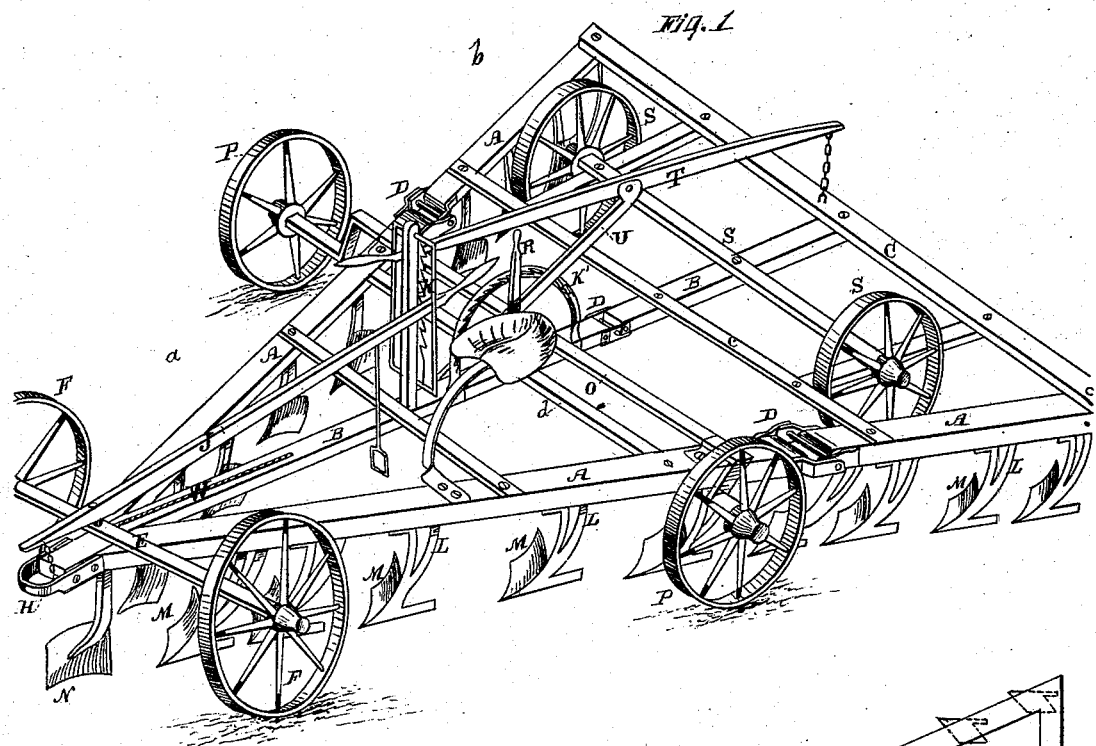
Figure 2:
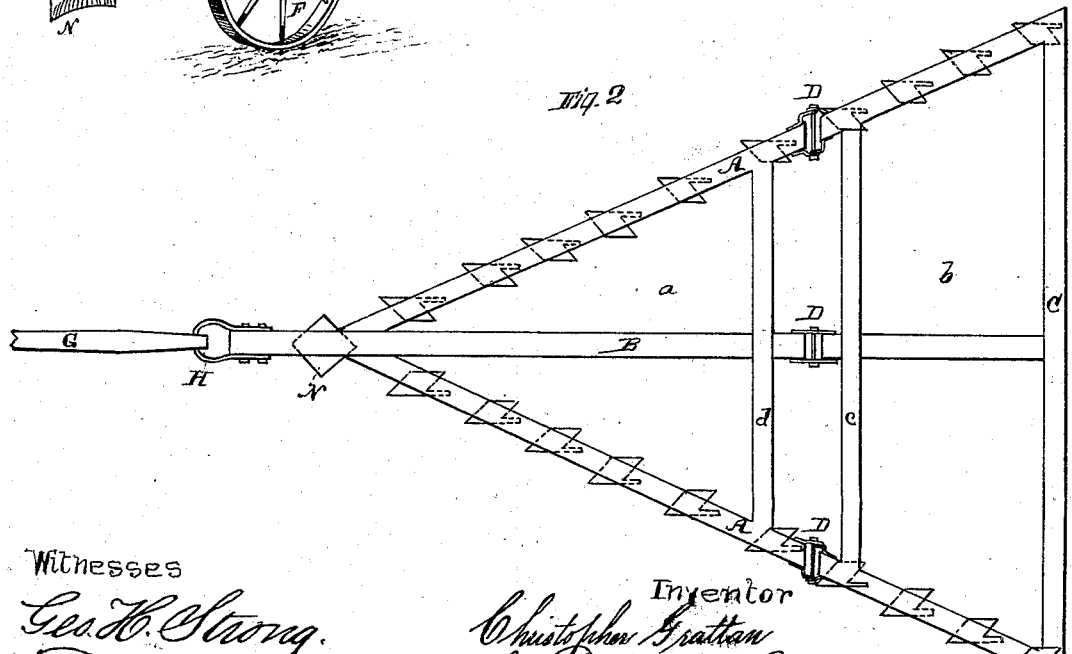

In the accompanying drawings, Figure 1 is a perspective view of my plow. Fig. 2 is a top view. Fig. 3 is a side view.

Let A represent the V-shaped frame or plow-beams, and B the draft-bar passing between the front ends of the plow-beams and back to a cross-bar, C, to which it is secured. The cross-bar C joins the rear ends of the plow-beams A, thus forming the base of the triangle, which figure the whole frame resembles. The plow-beams A and the draft-bar B are severed and hinged, as shown at D, thus making the frame in two sections, *a* and *b*, the rear section being denoted by *b*.

At the forward end of the draft-bar B is swiveled the axle E, carrying the wheels F and supporting the front end of the plow-frame from above. The tongue G extends from the axle, as shown. The end of the draft-bar B is provided with a link, H, for engaging with a hook or chain, I, on the end of the lever J, which lever is fastened to the axle E, which serves as a fulcrum and passes back to an upright rack, K, on the draft-bar B. By this device the frame-work or plow-beam A can be raised or lowered with reference to the wheels, so that the plows will take the ground or be raised out of it. The axle E is connected with the draft-bar, at a point a little to the rear, by a chain or wire rope, W, so that the plow is drawn directly from the axle of this forward truck.

Under the plow-beams A are the standards L, attached thereto by rivets or in any practicable way. Fastened to the standards L are the plowshares M, being so set as that those upon one beam shall be right-handed, and those upon the other left-handed, which will thus cause the dirt to be thrown toward the center.

I can place as many plows as I wish, and on account of the divergence of the frame-work or beams A, each plow will work a different row and throw its earth into the furrow made by the plow in front, thus effectively turning up the ground. The earth, by being thus thrown toward the center, will form a slightly-convexed surface the full width of the machine.

At the forward end or apex of the frame, instead of a leading-plow, I place the cutter N, formed with a single blade, as shown, and designed for cutting the grass and weeds and preparing a way in front. A space is thus plowed equal to the whole width between the rearmost plows. By this arrangement the team walks upon solid ground all the time.

To the rear end of section *a* of the framework is attached the cranked axle O, with its wheels P. To turn this cranked axle O, the vertical lever R is attached, which passes to the curved rack K' and is there regulated. By this device the wheels P may be raised or lowered to conform with the ground, and allow the wheels S, attached to and running within the rear section, *b*, as shown, to run upon the plowed ground.

In order to assist in turning the machine, I have provided a way of raising the rear section, *b*, clear of the ground. Attached to the rear or cross bar, C, at its center is the lever T, which passes forward to the upright rack K, and has for a fulcrum an upwardly-inclined beam, U, attached at its lower end to the draft-bar B. Thus, by lowering the lever T, the section $b$, hinged as shown, will be raised clear of the ground, and an easy turn may be made. The section $b$ is provided with the wheels S, mounted upon the axle $s$ at such a height as to run upon the top of the ground when the plows are in the ground their proper depth. These wheels S may be raised with the section entirely clear of the ground for the purpose of turning.

The upright rack K is made with appropriate rows of teeth to engage with and secure the two levers J and T. The curved rack K', the rack K, and the handles of the levers are so placed as to be within reach of the driver's seat, and the driver can thus operate them all. The sections $a$ and $b$ have the strengthening cross-bars $c$ and $d$, respectively.

The position of the plowshares M, so that they throw the earth to the center, prevents the drag to one side which always attends the working of ordinary and single plows.

By this construction I am enabled to use a great number of small plows, covering a wide surface, and balancing each other, and because of its two sections hinged together and three sets of wheels connected with the levers, I can control every portion of it, front, center, and rear, raising and lowering it as necessary, and by raising the rear section I can make a short turn.

On account of the width of the machine, a number of horses can be placed abreast without walking upon the plowed ground, and their power is used to a better advantage than if they were strung out. For the same reason its width permits it to plow close to fences and trees, because the rear plows extend beyond interference with anything.

Having thus described my invention, what I claim as new, and desire to secure by Letters Patent, is—

1. A gang-plow consisting of the diverging plow frames or beams A, with the opposing series of right and left plows secured to the two beams, respectively, said frame being jointed or hinged at D, in combination with the three pairs of wheels F, P, and S, whereby the front, center, and rear of the machine are supported independently, substantially as herein described.

2. The diverging jointed plow-frame $a$ $b$, with its oppositely-placed plows and the three pairs of wheels F P S, in combination with the levers J R T, with their retaining-racks, whereby the front, center, and rear of the plow-frame may be elevated or depressed, substantially as herein described.

3. The V-shaped plow-frame $a$ $b$, jointed at D, and having its forward portion supported upon the two pairs of wheels F P, and the rear portion provided with the wheels S, in combination with the lever T and rack K, whereby the rear portion of the frame $b$, with its wheels S, may be elevated from the ground, substantially as and for the purpose herein described.

In witness whereof I have hereunto set my hand.

CHRISTOPHER GRATTAN.

Witnesses:
S. H. NOURSE,
FRANK A. BROOKS.